Nov. 14, 1933.   T. E. BOSWORTH   1,935,433
OPHTHALMIC MOUNTING
Filed Dec. 18, 1930   2 Sheets-Sheet 1
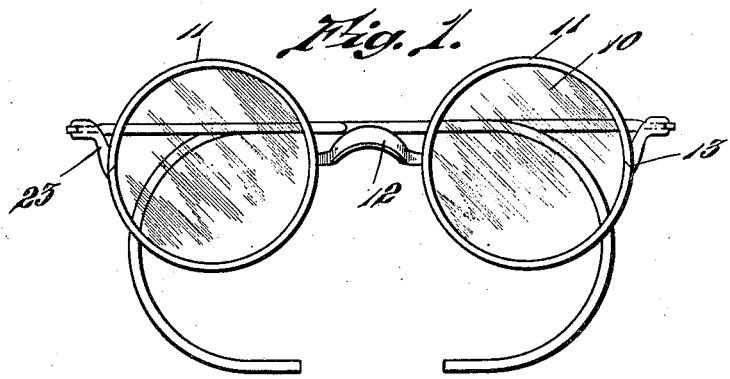
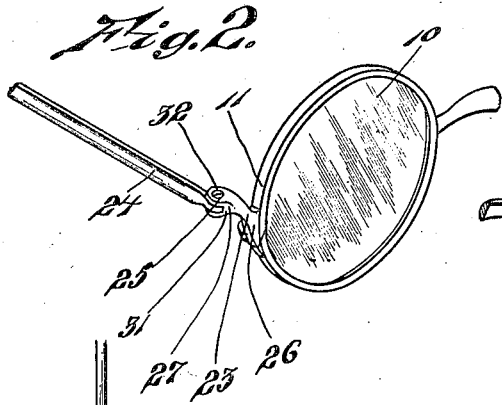
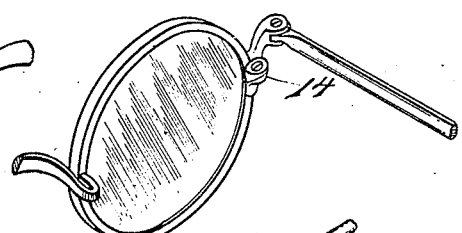
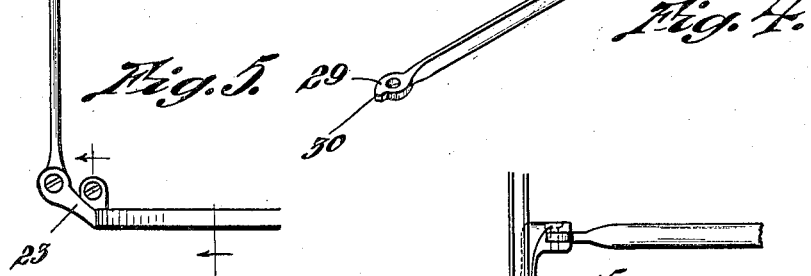
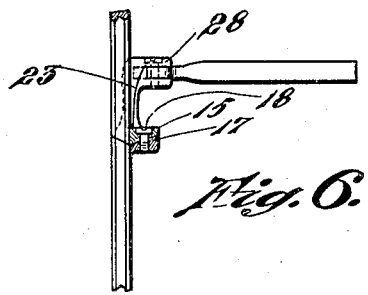
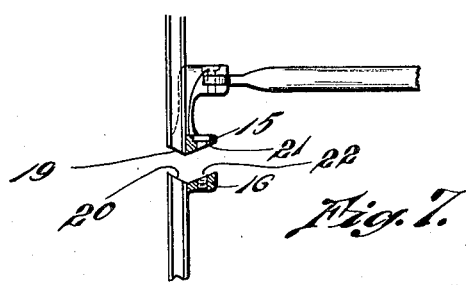
INVENTOR.
Thomas E. Bosworth
BY
Barlow & Barlow
ATTORNEYS.

Nov. 14, 1933.　　　T. E. BOSWORTH　　　1,935,433
OPHTHALMIC MOUNTING
Filed Dec. 18, 1930　　　2 Sheets-Sheet 2
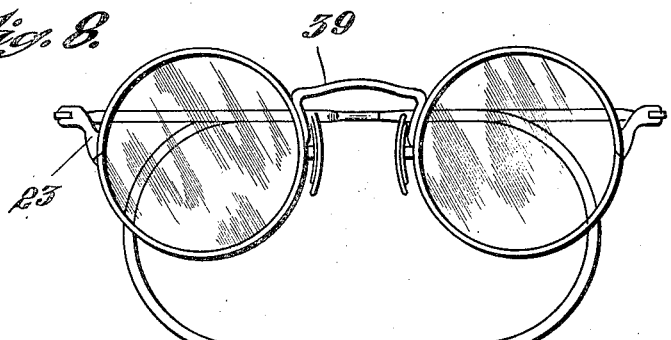
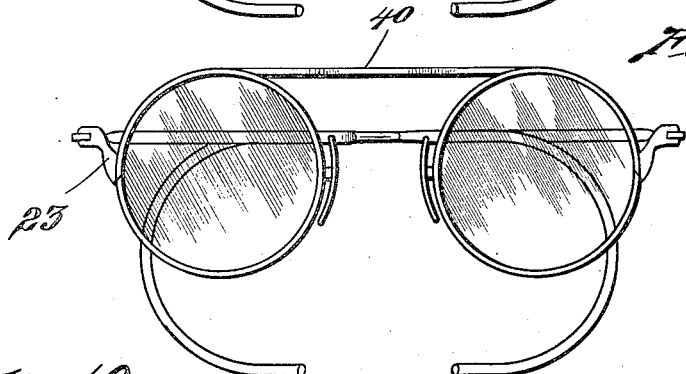
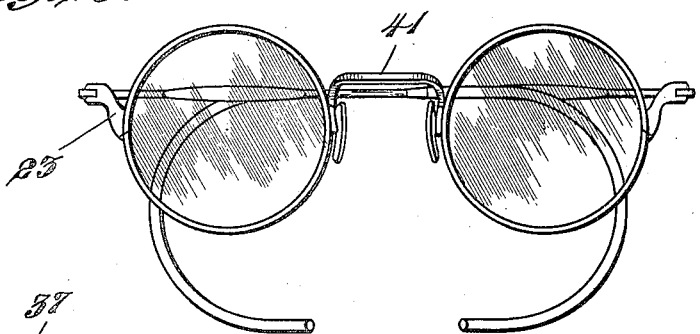
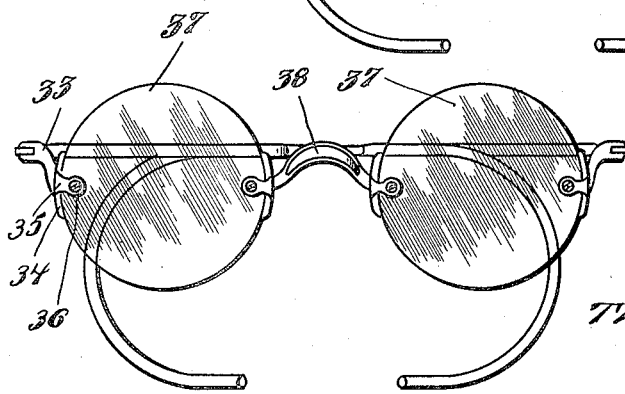
INVENTOR.
Thomas E. Bosworth
BY Barlow & Barlow
ATTORNEYS.

Patented Nov. 14, 1933

1,935,433

UNITED STATES PATENT OFFICE 1,935,433

OPHTHALMIC MOUNTING

Thomas E. Bosworth, Providence, R. I., assignor to Universal Optical Corporation, a corporation of Rhode Island Application December 18, 1930
Serial No. 503,267

8 Claims. (Cl. 88—53)

This invention relates to an ophthalmic mounting, more particularly the end piece thereof; and has for its object to provide a construction by which the temples can be arranged above the line of sidewise vision of the wearer.

Another object of the invention is to provide a temple having a raised position by the shape of a neat and well-formed end piece and one in which the lens may be removed without disturbing the end piece of the temple, and in which the temple may be removed or disjointed without disturbing or affecting in any way the mounting of the lens.

Another object of the invention is the shaping of the abutting ends of the rim so as to prevent lateral movement of the ends out of the plane of the rims.

A further object of the invention is the provision of a raised temple by the arrangement of the end piece and the location thereof so that it may be largely hidden from view by being inclined rearwardly as well as upwardly from its point of attachment to the lens.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a front elevation of an ophthalmic mounting with the temples in folded position, showing my improved end piece for raising the plane of the temples;

Fig. 2 is a perspective view of a fragmental portion of the mounting and showing particularly the end piece as extending at an angle to the horizontal plane thereof;

Fig. 3 is a view similar to Figure 2, looking at the opposite side of the mounting;

Fig. 4 is a perspective view of the temple;

Fig. 5 is a plan view of a fragmental portion of the lens rim and temple and showing the relation of the inclined end piece thereto;

Fig. 6 is a sectional view showing the end piece and the barrel for securing the ends of the rim in section and in its relative position on the frame;

Fig. 7 is a view similar to Figure 6, showing the ends of the rims separated;

Fig. 8 is a front elevation of a modified form of the end piece as mounted upon a frame having a differently constructed bridge and showing the relation of the end piece to the bridge;

Fig. 9 is a front elevation of a modified form showing the end piece in its relation to a still differently shaped bridge;

Fig 10 is a front elevation of a still further modified form showing the end piece in its relation to a yet differently shaped bridge;

Fig. 11 is a front elevation of a still further modification and showing the end piece as mounted upon the lens itself rather than upon the rim which encircles the same.

It has been found desirable to provide spectacle frames with temples located in a position which will not obstruct the unconscious side glance of the wearer so that any object moving or stationary may attract attention of the wearer, such vision being to the side of the lenses rather than through the same; and in order to accomplish this result, I have provided an end piece which is secured to the lens either directly or to the lens rim at a point in line with the center of the same, but which extends upwardly and rearwardly at an angle to the horizontal and on an incline so that the temple which is hinged thereto will be materially raised above the center of the horizontal plane through the center of the lenses and will be above the line of sidewise vision of the wearer; and by providing this end piece inclined somewhat rearwardly, the same is largely inconspicuous from view and being of a substantial extent, I mount the same upon one of the abutting ends of the rim so that the hinge mounting of the temple is unaffected by separation for mounting the lens or the temple may be positioned without in any way disturbing the lens; and the following is a detailed description of the present embodiment of this invention, illustrating the preferred means by which these advantageous results may be accomplished.

With reference to the drawings, particularly Figures 1 to 7, reference character 10 designates the lens which is mounted in one of the rims 11, which rims are joined together by a bridge 12. These rims are each split at their outer edges as at 13, to be separated a sufficient distance to position the lens 10 therein, after which they are secured together to hold the same in mounted position.

The abutting ends of the rims at the split portion 13 are held together by a barrel 14 which has one portion 15 mounted upon the upper end of the rim and a lower portion 16 mounted on the lower end of the rim and which is held together by a suitably threaded bolt 17 having a slotted head 18 for manipulation. This split 13 is formed in the shape of a V, illustrated clearly in Figures 6 and 7 in which the V is carried not only into the rim but also into the barrel portion 14. The inclined surfaces 19 and 20 are on the rim and cooperating inclined surfaces 21 and 22 on the barrel, which snugly fit together and prevent any lateral movement of the ends of the rim out of the plane thereof even though the connecting bolt 17 should become slightly loosened.

An end piece or post 23 is mounted wholly upon the upper end of the rim and at the rear thereof, the same extending rearwardly and upwardly from its point of connection so that the same is partialy hidden from view from the front of the mounting and so that the temple 24 which is hinged as at 25 to the upper end of the end piece is raised from a horizontal plane through the center of the lenses and is out of line with the sidewise vision beyond the edges of the mounting. This end piece 23 is suitably flared as at 26 to provide an increased attaching surface for mounting upon the rim 11, and is then shaped inwardly to reduce the stock intermediate its ends and is provided with an enlargement 27 slotted to provide ears 28 to receive between them the flattened ear 29 of the temple 24 which has a projecting stop 30 thereon to engage the edge 31 of the slot to limit the outward swinging movement of the temple.

It is, of course, understood that the threaded screw 32 extends through the ears of the end piece and temple to hingedly mount the same in position.

The end piece, by a slightly modified construction, as illustrated at 33 in Figure 11, may be provided with a saddle portion 34 with arms 35 to receive between them a screw 36 to mount the end piece directly upon the lens 37, a pair of which lenses are secured together by a bridge 38 in the usual manner.

The structure shown in Figures 8 and 9 and 10 illustrate end pieces 23 similar to those shown in Figures 1 to 7 but provide the rims of the mounting connected together by bridges of different constructions, thus we have a type of bridge 39 in Figure 8, 40 in Figure 9, and 41 in Figure 10, each of which shows a different relation of the temples thereto, but in all of which the temples are raised with reference to the horizontal center through the lenses, and in which raised position the temples are above the line of sidewise vision of the user.

While I have described certain construction forms which embody the principles of my invention, it is obvious that other desired changes in arrangement may be made within the spirit and the scope of the invention as defined in the appended claims.

I claim:

1. An ophthalmic mounting comprising lenses, rims about said lenses, a bridge piece joining said rims, end pieces rigidly secured to the middle of said rims at their outer edges and inclined upwardly and rearwardly whereby the end pieces are fore-shortened in appearance, and temples hinged to said end pieces at their upper ends whereby the temples are hinged in a horizontal plane above the direction of sidewise vision of the wearer.

2. An ophthalmic mounting comprising lenses, rims about said lenses, a bridge piece joining said rims, end pieces rigidly secured to the middle of the outer edge of said rims and extending upwardly and rearwardly at an angle to a horizontal plane through the centers of said lenses whereby the end pieces are fore-shortened in appearance, and temples hinged to said end pieces whereby the temples are hinged in a horizontal plane above the direction of sidewise vision of the wearer.

3. An ophthalmic mounting comprising lens rims, each having abutting ends adjacent its outer edges, a barrel having a portion secured to each of said ends, means for holding said portions together to secure the ends in abutting relation and separate posts rigidly mounted wholly on the upper of said ends and inclined upwardly from is point of attachment and provided with a temple joint.

4. An ophthalmic mounting, comprising lens rims, each having abutting ends adjacent its outer edges, a barrel having a portion secured to each of said ends, means for holding said portions together to secure the ends in abutting relation, the abutting ends having surfaces at an angle to a horizontal plane through the center of the lens rims, and an end piece mounted wholly on the upper of said ends and inclined upwardly from its point of attachment.

5. An ophthalmic mounting comprising lens rims, each having abutting ends adjacent its outer edges, a barrel having a portion secured to each of said ends, means for holding said portions together to secure the ends in abutting relation, said abutting ends being V-shaped to prevent relative movement of the same, and an end piece mounted wholly on the upper of said ends and inclined upwardly from its point of attachment.

6. An ophthalmic mounting comprising lens rims, each having abutting ends adjacent its outer edges, a barrel having a portion secured to each of said ends, means for holding said portions together to secure the ends in abutting relation, said abutting ends being V-shaped and arranged to prevent relative lateral movement of the ends out of the plane of said rims, and an end piece mounted wholly on the upper of said ends and inclined rearwardly and upwardly from its point of attachment.

7. In an ophthalmic mounting, a lens rim having separable ends, a post rigidly secured to the rim and extending upwardly at an angle to the horizontal plane through the centers of the lenses to raise the temple thereabove and a separable barrel secured to the rear surface of said rim with one portion secured to each of said separable ends, whereby the barrel is practically hidden by the rim.

8. In an ophthalmic mounting, a lens rim, a post rigidly secured to the rim and extending upwardly at an angle to the horizontal plane thru the centers of the lenses to connect the temple to the lenses and locate the same above the horizontal centers of the lenses, and a separable barrel secured to the rear surface of said rim with one portion secured to each of said separable ends, whereby the barrel is practically hidden by the rim.

THOMAS E. BOSWORTH.